(12) United States Patent
Jammalamadaka (10) Patent No.: US 9,189,810 B2
(45) Date of Patent: *Nov. 17, 2015

(54) MINING PRODUCT RECOMMENDATION FROM QUERY REFORMULATIONS

(71) Applicant: eBay Inc., San Jose, CA (US)

(72) Inventor: Ravi Chandra Jammalamadaka, Santa Clara, CA (US)

(73) Assignee: eBay, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/622,417

(22) Filed: Feb. 13, 2015

(65) Prior Publication Data

US 2015/0161708 A1    Jun. 11, 2015

Related U.S. Application Data

(63) Continuation of application No. 14/464,494, filed on Aug. 20, 2014, now Pat. No. 8,959,105, which is a continuation of application No. 14/051,794, filed on Oct. 11, 2013, now Pat. No. 8,832,137, which is a continuation of application No. 12/878,729, filed on Sep. 9, 2010, now Pat. No. 8,566,339.

(51) Int. Cl.
*G06F 17/30* (2006.01)
*G06Q 30/06* (2012.01)
*G06Q 30/02* (2012.01)

(52) U.S. Cl.
CPC ........ *G06Q 30/0631* (2013.01); *G06F 17/3064* (2013.01); *G06F 17/30522* (2013.01); *G06F 17/30864* (2013.01); *G06F 17/30873* (2013.01); *G06Q 30/02* (2013.01); *G06Q 30/0282* (2013.01); *G06Q 30/0625* (2013.01)

(58) Field of Classification Search
CPC ..................... G06F 17/30864; G06Q 30/0282
USPC ......... 707/759, 767, 769; 705/26.7, 14.54, 53
See application file for complete search history.

(56) References Cited

U.S. PATENT DOCUMENTS

| | | | |
|---|---|---|---|
| 8,027,864 B2 | 9/2011 | Gilbert | |
| 8,566,339 B2 | 10/2013 | Jammalamadaka | |
| 8,832,137 B2 | 9/2014 | Jammalamadaka | |
| 8,959,105 B2 | 2/2015 | Jammalamadaka | |
| 2010/0281029 A1 | 11/2010 | Parikh et al. | |
| 2012/0066243 A1 | 3/2012 | Jammalamadaka | |
| 2014/0040304 A1 | 2/2014 | Jammalamadaka | |
| 2014/0358721 A1 | 12/2014 | Jammalamadaka | |

OTHER PUBLICATIONS

"U.S. Appl. No. 12/878,729, Non Final Office Action mailed Dec. 20, 2012", 9 pgs.
"U.S. Appl. No. 12/878,729, Notice of Allowance mailed Jun. 19, 2013", 13 pgs.
"U.S. Appl. No. 13/878,729, Response filed Apr. 22, 2013 to Non Final Office Action mailed Dec. 20, 2012", 13 pgs.
"U.S. Appl. No. 14/051,794, Notice of Allowance mailed May 9, 2014", 15 pgs.
"U.S. Appl. No. 14/464,494, Notice of Allowance mailed Oct. 7, 2014", 9 pgs.
"U.S. Appl. No. 14/464,494, Preliminary Amendment filed Aug. 21, 2014", 6 pgs.

*Primary Examiner* — Cheryl Lewis
(74) *Attorney, Agent, or Firm* — Schwegman Lundberg & Woessner, P.A.

(57) ABSTRACT

In various example embodiments, systems and methods to mine product recommendations from query reformulation is provided. In example embodiments, a query that corresponds to a particular product is received. Transition data for the particular product is accessed. The transition data includes values indicating a number of search transitions based on a change in queries between the particular product and other products in previous session sets of queries. One or more recommendations based on the transition data is determined and provided to the user.

20 Claims, 7 Drawing Sheets

MINING PRODUCT RECOMMENDATION FROM QUERY REFORMULATIONS

RELATED APPLICATIONS

This application is a continuation of and claims the benefit of priority under to U.S. patent application Ser. No. 14/464,494, filed Aug. 20, 2014, now U.S. Pat. No. 8,959,105, which is a continuation of and claims the benefit of priority under to U.S. patent application Ser. No. 14/051,794, filed Oct. 11, 2013, now U.S. Pat. No. 8,832,137, which is a continuation of U.S. patent application Ser. No. 12/878,729, filed Sep. 9, 2010, now U.S. Pat. No. 8,566,339, each of which are incorporated herein by reference in its entirety.

FIELD

The present disclosure relates generally to the field of computer technology, and in a specific example embodiment, to mining product recommendation from query reformulations.

BACKGROUND

Websites provide a number of publishing, listing, and price-setting mechanisms whereby a user (e.g., a seller) may list or publish information concerning items. In one example, the items may be items for sale by the seller. In this example, users (e.g., buyers) may search for items and receive recommendations. In conventional systems, the recommendations are based on past purchase history of other users. For example, other users that have purchased item1 also purchased item2. Therefore, if the user selects item1, the user is provided a recommendation to item2. Purchase history recommendations are usually limited to identifying complementary items. For example, item2 is typically an accessory for item1.

BRIEF DESCRIPTION OF DRAWINGS

The appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a network-based publication environment, the embodiments are given merely for clarity in disclosure. Thus, any type of electronic publication, electronic commerce, or electronic business system and method, including various system architectures, may employ various embodiments of the system and method described herein and be considered as being within a scope of example embodiments. Each of a variety of example embodiments is discussed in detail below.

Example embodiments described herein provide systems and methods for providing recommendations to a user based on query reformulation. Typically, a user will change terms used in queries when searching for products (e.g., item or information). A web session may comprise a series of such queries (e.g., a session set). While each query is directed to a particular product, not all queries are for the same product. Users tend to transition between products between a first query and an $n^{th}$ query (e.g., changing from searching for one product to a different product). By using transition reformulation, recommendations are directed to more equal level items (e.g., one type of handbag for another type of handbag) instead of complementary items (e.g., an iPod and iPod accessories).

In one embodiment, a plurality of session sets received from a plurality of users is collected. A session set comprises a series of queries performed during one search session by user. The plurality of session sets may then be processed in batches. The processing includes analyzing each of the session sets to determine a search transition between two products. Transition data directed to the search transition between the two products is updated. The updating of the transition data includes incrementing a transition count between the two products. The transition data is then used to provide a recommendation to another user who is searching for the same or similar product at a later time.

When the further user provides a search query that is mapped to the particular product, transition data for the particular product is accessed. The transition data includes values reflecting a number of search transitions (e.g., transition count) in previous queries between the particular product and other products. One or more recommendations based on the transition data is determined and provided to the user. In one embodiment, a predetermined top number of products based on the transition data are provided as the one or more recommendations.

By using embodiments of the present invention, a user performing a search can be provided recommendations that may be more tailored to the user's interest. Accordingly, one or more of the methodologies discussed herein may obviate a need for the user to conduct additional searching, which may have the technical effect of reducing computing resources used by one or more devices within the system. Examples of such computing resources include, without limitation, processor cycles, network traffic, memory usage, storage space, and power consumption.

Figure 1:
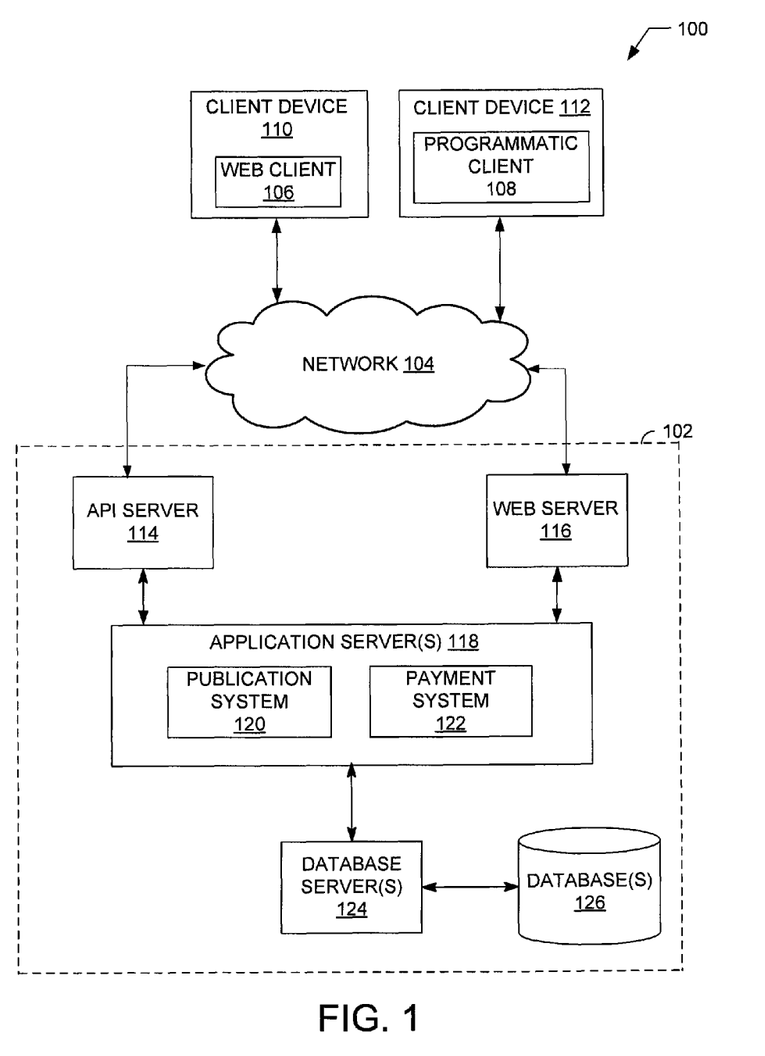
FIG. 1 is a block diagram illustrating an example embodiment of a network architecture of a system used to identify items depicted in images.

With reference to FIG. 1, an example embodiment of a high-level client-server-based network architecture 100 to provide content based on an image is shown. A networked system 102, in an example form of a network-server-side functionality, is coupled via a communication network 104 (e.g., the Internet, wireless network, cellular network, or a Wide Area Network (WAN)) to one or more client devices 110 and 112. FIG. 1 illustrates, for example, a web client 106 operating via a browser (e.g., such as the INTERNET EXPLORER® browser developed by Microsoft® Corporation of Redmond, Washington State), and a programmatic client 108 executing on respective client devices 110 and 112.

The client devices 110 and 112 may comprise a mobile phone, desktop computer, laptop, or any other communication device that a user may utilize to access the networked system 102. In some embodiments, the client device 110 may comprise or be connectable to an image capture device (e.g., camera). The client device 110 may also comprise a voice recognition module (not shown) to receive audio input and a display module (not shown) to display information (e.g., in the form of user interfaces). In further embodiments, the client device 110 may comprise one or more of a touch screen, accelerometer, and GPS device.

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage repositories or database(s) 126. In one embodiment, the databases 126 are storage devices that store content, user preferences, user profiles, transition data, or recommendation selection data.

The publication system 120 publishes content on a network (e.g., Internet). As such, the publication system 120 provides a number of publication and marketplace functions and services to users that access the networked system 102. The publication system 120 is discussed in more detail in connection with FIG. 2. In example embodiments, the publication system 120 is discussed in terms of a marketplace environment. However, it is noted that the publication system 120 may be associated with a non-marketplace environment.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account, PayPal, or credit card) for purchases of items via the network-based marketplace. While the publication system 120 and the payment system 122 are shown in FIG. 1 to both form part of the networked system 102, it will be appreciated that, in alternative embodiments, the payment system 122 may form part of a payment service that is separate and distinct from the networked system 102.

While the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
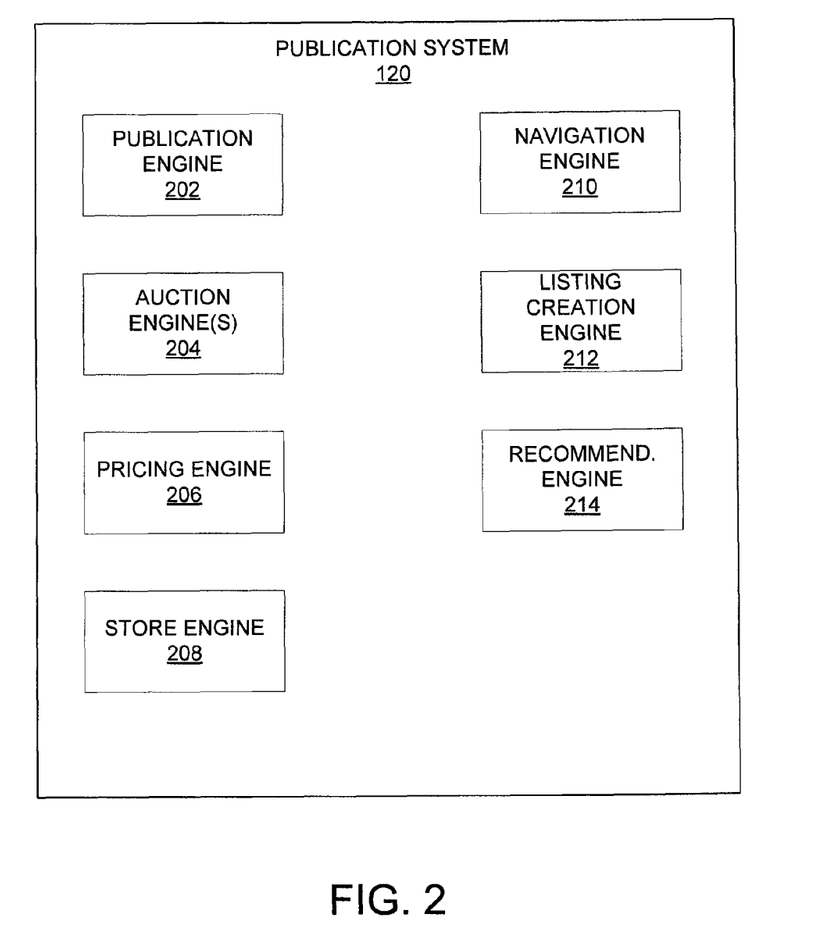
FIG. 2 is a block diagram illustrating an example embodiment of a publication system.

Referring now to FIG. 2, an example block diagram illustrating multiple components that, in one example embodiment, are provided within the publication system 120 of the networked system 102 is shown. The publication system 120 may be hosted on dedicated or shared server machines (not shown) that are communicatively coupled to enable communications between the server machines. The multiple components, themselves, are communicatively coupled (e.g., via appropriate interfaces), either directly or indirectly, to each other and to various data sources, to allow information to be passed between the components or to allow the components to share and access common data. Furthermore, the components may access the one or more database(s) 126 via the one or more database servers 124, both shown in FIG. 1.

In one embodiment, the publication system 120 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more auction engines 204 that support auction-format listing and price setting mechanisms (e.g., English, Dutch, Chinese, Double, Reverse auctions, etc.). The various auction engines 204 also provide a number of features in support of these auction-format listings, such as a reserve price feature, whereby a seller may specify a reserve price in connection with a listing, and a proxy-bidding feature, whereby a bidder may invoke automated proxy bidding.

A pricing engine 206 supports various price listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed price that is typically higher than a starting price of an auction for an item.

A store engine 208 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

Navigation of the network-based publication system 120 may be facilitated by a navigation engine 210. For example, a search module (not shown) of the navigation engine 210 enables keyword queries of listings published via the publication system 120. In a further example, a browse module (not shown) of the navigation engine 210 allows users to browse various category, catalog, or inventory data structures according to which listings may be classified within the publication system 120. Various other navigation applications within the navigation engine 210 may be provided to supplement the searching and browsing applications.

A listing creation engine 212 allows sellers to conveniently author listings of items. In one embodiment, the listings pertain to goods or services that a user (e.g., a seller) wishes to transact via the publication system 120. Each good or service is associated with a particular category. In other embodiments, a user may create a listing that is an advertisement or other form of publication.

A recommendation engine 214 performs analysis on queries in order to provide recommendations. In example embodiments, the recommendation engine 214 analyzes queries in order to determine transition graphs and related transition data. The transition graph is discussed in more detail in connection with FIG. 4. Using the transition data, recommendations may be provided to users based on the user's current query. The recommendation engine 214 will be discussed in more detail in connection with FIG. 3.

Although the various components of the publication system 120 have been defined in terms of a variety of individual modules and engines, a skilled artisan will recognize that many of the items can be combined or organized in other ways. Furthermore, not all components of the publication system 120 have been included in FIG. 2. In general, components, protocols, structures, and techniques not directly related to functions of example embodiments (e.g., dispute resolution engine, loyalty promotion engine, reputation engines, listing management engines, etc.) have not been shown or discussed in detail. The description given herein simply provides a variety of example embodiments to aid the reader in an understanding of the systems and methods used herein.

Figure 3:
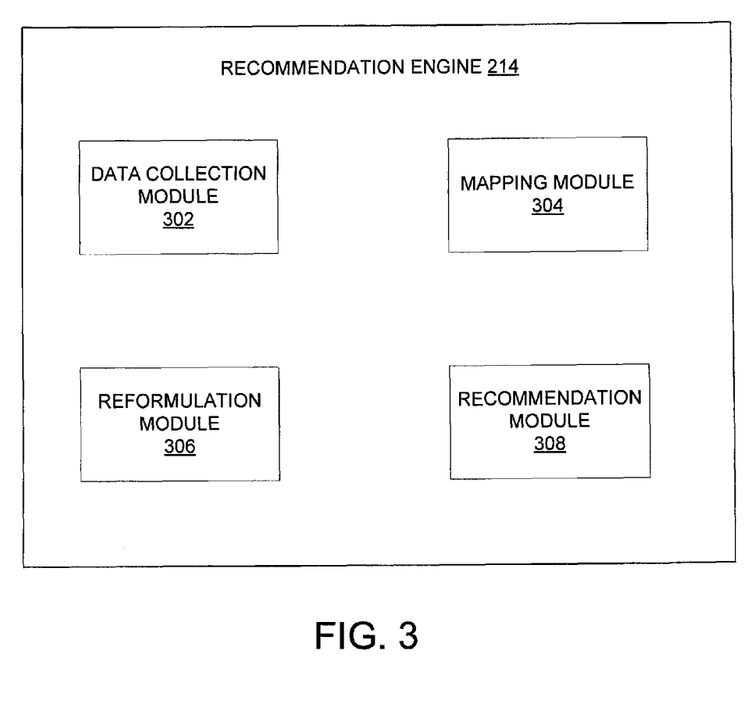
FIG. 3 is a block diagram illustrating an example embodiment of a recommendation engine.

Application of Embodiments of the Recommendation System into the Example Network Architecture Referring now to FIG. 3, an example diagram of the recommendation engine 214 is shown. In example embodiments, the recommendation engine 214 comprises a data collection module 302, mapping module 304, reformulation module 306, and a recommendation module 308. In alternative embodiments, one or more of the modules depicted within the recommendation engine 214 may be located within another component of the publication system 120 (e.g., within the navigation engine 210).

The data collection module 302 collects all queries received by the publication system 120. In one embodiment, the queries within a single search session by each user are assembled into a session set for later analysis by the data collection module 302. Each session set is then stored (e.g., in the databases 126) for later processing. The data collection module 302 may also collect and store data directed to selections and non-selections of recommendations provided to users. A selection of a recommendation may include viewing, watching, or purchasing an item of the recommendation. The selection sets and selection data may then be processed in batches at a later time (e.g., evenings, once a week). Furthermore, the session sets and selection data may be processed during off-peak hours or when there is less demand for computing resources.

The data collection module 302 may further receive a current query from a user. The current query is forwarded to the recommendation module 308 to determine recommendations to present to the user.

The mapping module 304 maps each query in the session set to a product. In example embodiments, the mapping module 304 maps the query to a product in a category based on keywords in a keyword query. In mapping the query, the mapping module 304 takes into consideration common misspellings of words and synonyms. For example, if a user enters "Prada bag" as a keyword query, the mapping module 304 may map the query to a product "Prada purses" in category "bags," "handbags," or "purses." As such, the mapping module 304 may maintain tables of query terms and their synonyms and common misspellings. In some embodiments, the query may be mapped to more than one product.

The reformulation module 306 generates transition graphs and corresponding transition data based on each session set. In example embodiments, the reformulation module 306 takes the mappings determined by the mapping module 304 and increments a transition count for each search transition between different products. In one embodiment, each transition performed by a user may cause a transition count for a particular link between two products (e.g., transition data) to be incremented by a value of one (1). Continuing with the bag example, the reformulation module 306 increments a transition count for queries that transition from "Prada bag" to "Gucci bag" each time the transition occurs. The reformulation module 306 may also increment a separate transition count for queries that transition from "Gucci bag" to "Prada bag" each time that transition occurs.

The reformulation module 306 may further refine the results of the reformulation analysis. In an example embodiment, if the number of transitions between two products does not meet a minimum threshold (e.g., transition count<transition count threshold) over a certain period of time, the transition data for a link between the two products is not made accessible to the recommendation engine 214. The transition data, in this case, may simply be deleted since the transition count is below the transition count threshold for the latest batch of queries being processed. In one embodiment, the transition count threshold is one (1).

Alternatively, the transition data (e.g., based on the transition count) may be temporarily stored in the database in case future reformulation analysis increases the transition count between the two products to a value above the transition count threshold. Furthermore, prior results of the reformulation analysis (e.g., the transition graphs and data) may be updated or replaced after each batch process. By replacing or updating the results of the reformulation analysis after each batch process, the recommendations provided by the recommendation engine 214 are based on more current interest and demand for particular products.

In some embodiments, the transition data may be weighted based on interactions with previous recommendations by users (e.g., based on recommendation selection data). For example, if a particular recommendation of a second product based on a first product is provided to a user but is not chosen by the user, the transition data for the link between the first product and second product may be decremented (e.g., minus 0.1 from the transition count). Similarly, if a particular recommendation of third product from the first product is suggested to and chosen by the user, the transition data for the link between the first product and the third product may be weighted in addition to an increment in the transition count (e.g., transition count increased by 1.1).

The recommendation module 308 provides recommendations to a current user based on query reformulation. In a first instance of a search session, the recommendation module 308 receives a product indication (e.g., mapping) based on a current query from the mapping module 304. Using the product indication, the recommendation module 308 accesses transition data to determine which other one or more products have a high transition count relationship with the indicated product. In one embodiment, the top m links associated with the highest transition counts serve as the recommendations, where m may be a default or programmable value.

It is noted that the top links based on the transition data may be based on a one-way transition or a combined count. For example, if the user queries "Prada bag," the recommendation module 308 may determine the top links based on one-way transitions from "Prada bag" to ProductA, ProductB, and ProductC. Alternatively, the recommendation module 308 may determine the top links based on a combined count of transitions to and from "Prada bag" and ProductA, to and from "Prada bag" and ProductB, and to and from "Prada bag" and ProductC. Thus, a summation of the transition data between two products is used. Further embodiments may use some other weighted function of the transition data between two products.

The recommendations are then provided to the user by the recommendation module 308. In one embodiment, main search results may be positioned in a center of a web page while recommendations are provided along one or more perimeters of the web page. The recommendations may be a recommendation for a particular product (e.g., one or more item listings for the particular product).

In further instances of the search session, the recommendation module 308 may factor in selection or rejection of previous recommendations (e.g., recommendation selection data) provided within the same search session in providing the recommendations. For example, if the user is provided a recommendation for ProductA for a certain maximum recommendation threshold (e.g., three times) and the user does not select the recommendation any of those times (e.g., instead choosing a recommendation for ProductB, ProductC, and ProductD), the recommendation module 308 may stop recommending ProductA. Alternatively, if the user is provided a recommendation for ProductE and has selected the recommendation for further review, the recommendation module 308 may not provide a recommendation for ProductE again since it was previously selected.

In some embodiments, the recommendation module 308 may provide a category recommendation. For example, if a transition is between two products belonging to the same class or category (e.g., bags), the recommendation module 308 may provide a recommendation to a different, complementary category (or products in a different category) having top links with the current category (e.g., from bags to shoes).

Alternatively, the recommendation module 308 may provide product recommendations within a single category. In example embodiments, if a transition is between two products belonging to the same class or category (e.g., bags), the recommendation module 308 may provide a recommendation to a different product in the same category having top links. For example, if the transition is from a query for "Prada bags" to "Gucci bags," the recommendation module 308 may recommend "Louis Vuitton bags."

In one embodiment, the settings used by the recommendation module 308 in determining recommendations may be a default. Alternatively or in addition, the user may adjust or set preferences for determining recommendations. For example, the user may indicate a maximum number of times a particular product should be recommended to the user, that recommendations be product based (and not category based), and how recommendations are to be presented on an interface (e.g., peripheral on a web page, on a pop-up screen, image only, text only).

Figure 4:
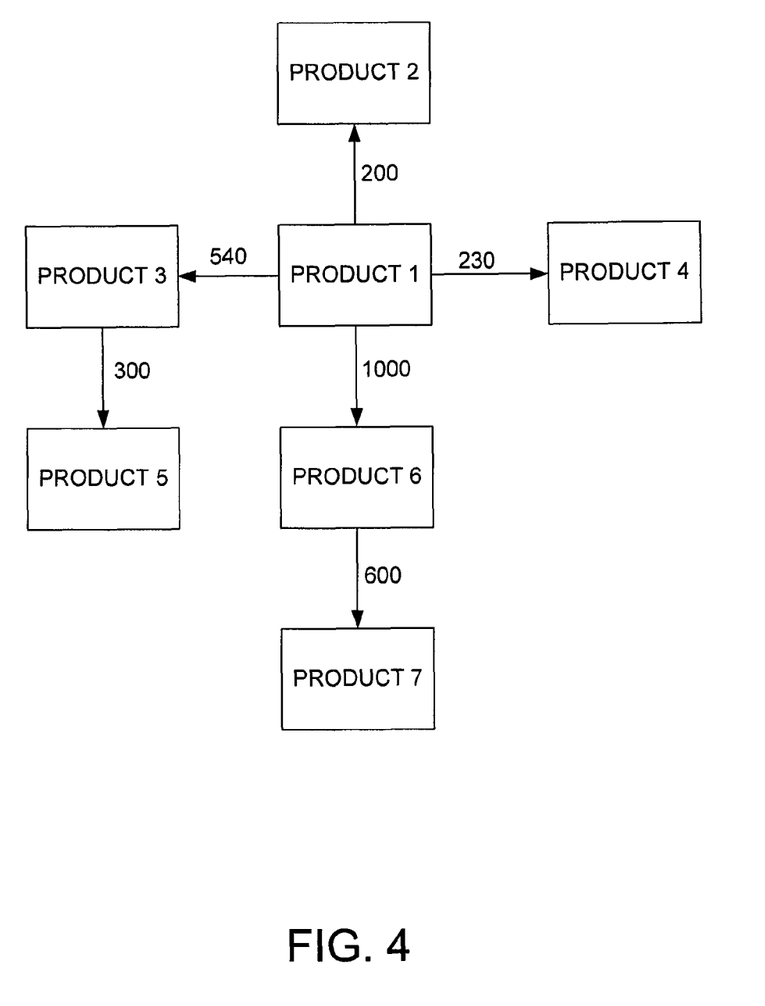
FIG. 4 is an example transition graph.

Referring to FIG. 4, an example transition graph is illustrated. While a physical graph is shown, it is noted that a transition graph may comprise a series of data and is not necessarily provided in a graphical format. The graph is used and discussed for illustrative purposes. In this example, the query is mapped to Product1, which is illustrated in the center of the transition graph. Product1 is shown to have a recommendation depth of one with Product2, Product3, Product4, and Product6. A value of transition data (e.g., transition count) from Product 1 to Product2 is 200, from Product1 to Product3 is 540, from Product1 to Product4 is 230, and from Product1 to Product6 is 1000. The transition graph also illustrates transition data from Product3 to Product5 and from Product6 to Product7. Thus, Product5 and Product7 have a recommendation depth of two with respect to Product1. Further recommendation depths may be used.

The recommendation module 308 is not restricted to a recommendation depth of one when providing recommendations. However, transition data for deeper recommendation depths (e.g., depth of two or more) may be weighted in order to determine priority. In one example, a recommendation depth of two may cause an application of a function that divides the transition data between the product at recommendation depth one with the product at recommendation depth two by a value of two, while a recommendation depth of three may cause an application of a function that divides the transition data between the product at recommendation depth two with the product at recommendation depth three by a value of four. Thus for example, the transition data between Product3 and Product5 is weighted to be a value of 150, while the transition data between Product 6 and Product 7 is weighted to be a value of 300. Therefore, the top three recommendations to be provided by the recommendation module 308, in this example, would be Product6 (transition data value=1000), Product3 (transition data value=540), and Product7 (weighted transition data value=300) in this same order. It is noted that any function may be used in determining the weighted value for deeper recommendation depths.

Figure 5:
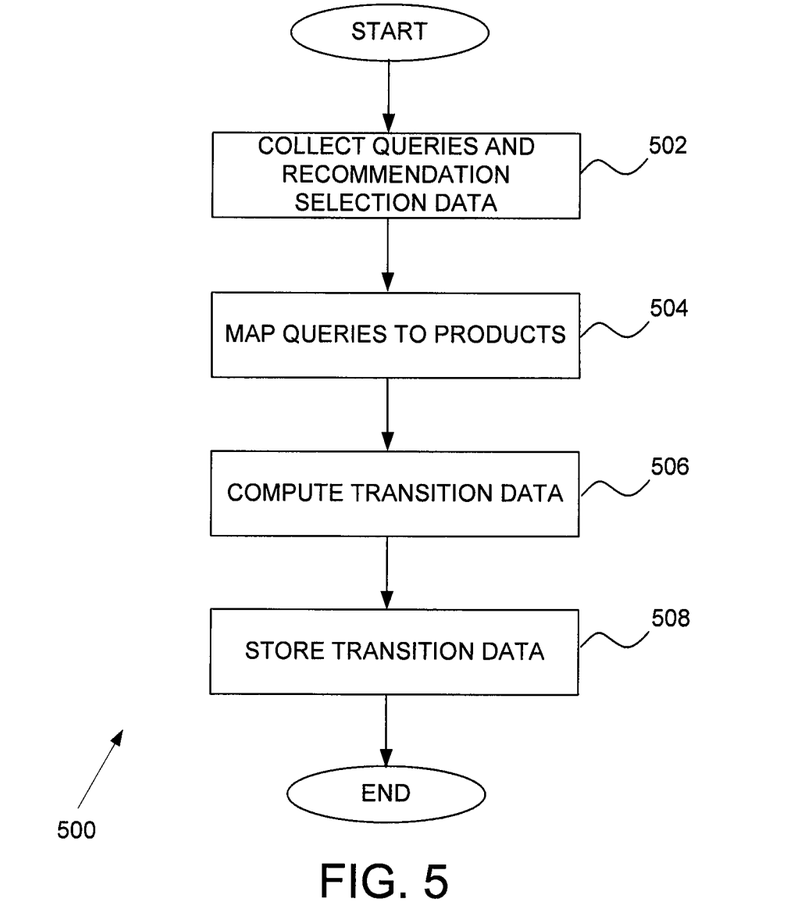
FIG. 5 is a flow diagram of an example method to perform query reformulation.

FIG. 5 is a flow diagram of an example method 500 to perform query reformulation. In operation 502, queries from a plurality of users are collected. In example embodiments, the data collection module 302 collects all queries received by the publication system 120 and assembles the questions into session sets for later analysis. The session sets are then stored (e.g., in the databases 126) for later processing. The data collection module 302 also collects and stores data directed to selections and non-selections of recommendations previously provided to users (e.g., recommendation selection data).

In example embodiments, the collected session sets and selection data may then be processed in batches at a later time or during off-peak hours. To that end, the queries in each session set are mapped to products in operation 504. The mapping module 304 may map the query to a product in a category based on keywords in the query. In mapping the query, the mapping module 304 takes into consideration misspellings of words and synonyms for the keywords.

In operation 506, transition data is computed. In example embodiments, the reformulation module 306 generates a transition graph and the corresponding transition data. The reformulation module 306 takes the mappings determined in operation 504 and increments a transition count (e.g., by a value of one) each time a transition between different products within the same session set occurs. The reformulation module 306 also factors in prior recommendation selection data in computing the transition data (e.g., the weight transition count).

The generated transition data is stored in operation 508. The transition data may replace previous versions of transition data stored for particular products or categories, or may supplement the previously stored transition data. The new transition data is then used in determining recommendations for users.

Figure 6:
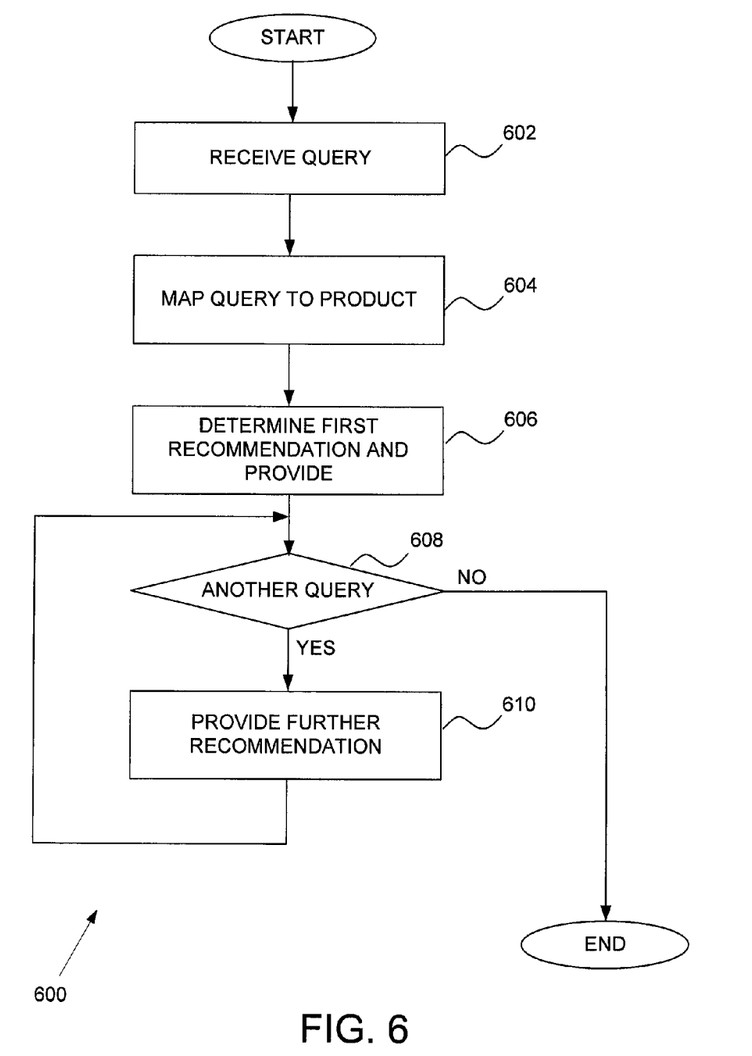
FIG. 6 is a flow diagram of an example method to provide recommendations based on query reformulation.

FIG. 6 is a flow diagram of an example method 600 to provide recommendations based on query reformulation. In operation 602, a current search query is received from a user. In example embodiments, the current search query comprises a keyword search for a particular product which is received by the publication system 120. As noted above, the data collection module 302 receives the query in order to assemble a session set for future query reformulation. The current query is forwarded to the recommendation module 308 for recommendation analysis. Alternatively, the recommendation module 308 may receive the current query and forward it to the data collection module 302. In one embodiment, the searches within a single search session are assembled into a session set for later analysis by the data collection module 302.

The current query is mapped to a product in operation 604. In example embodiments, the mapping module 304 maps the query to a product (or category). Transition data for the product may then be accessed by the recommendation module 308.

A first set of recommendations are determined in operation 606. The first set of recommendations is based on the current query and any user preferences that may be been previously provided to the publication system 120 (e.g., preferences stored in a user profile at the publication system 120). The recommendation module 308 reviews the transition data for the mapped product and determines a top number of recommendations. The top number of recommendations is then provided to the querying user as the first set of recommendations.

In operation 608, a determination is made as to whether there is another search query. If there is no further search query, then the method ends. However if there is another search query, then a further set of recommendations is provided in operation 610. In operation 610, the further set of recommendations may now be based on the mapped product corresponding to the new query, user preferences, and previous recommendation interactions (e.g., recommendation selection data associated with the current user in the current search session). As such, if the querying user has not selected a particular recommendation for a maximum recommendation threshold, the particular recommendation is not provided again. Similarly, if a particular recommendation is provided and selected, the particular recommendation may not be provided again.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Storage Medium

Figure 7:
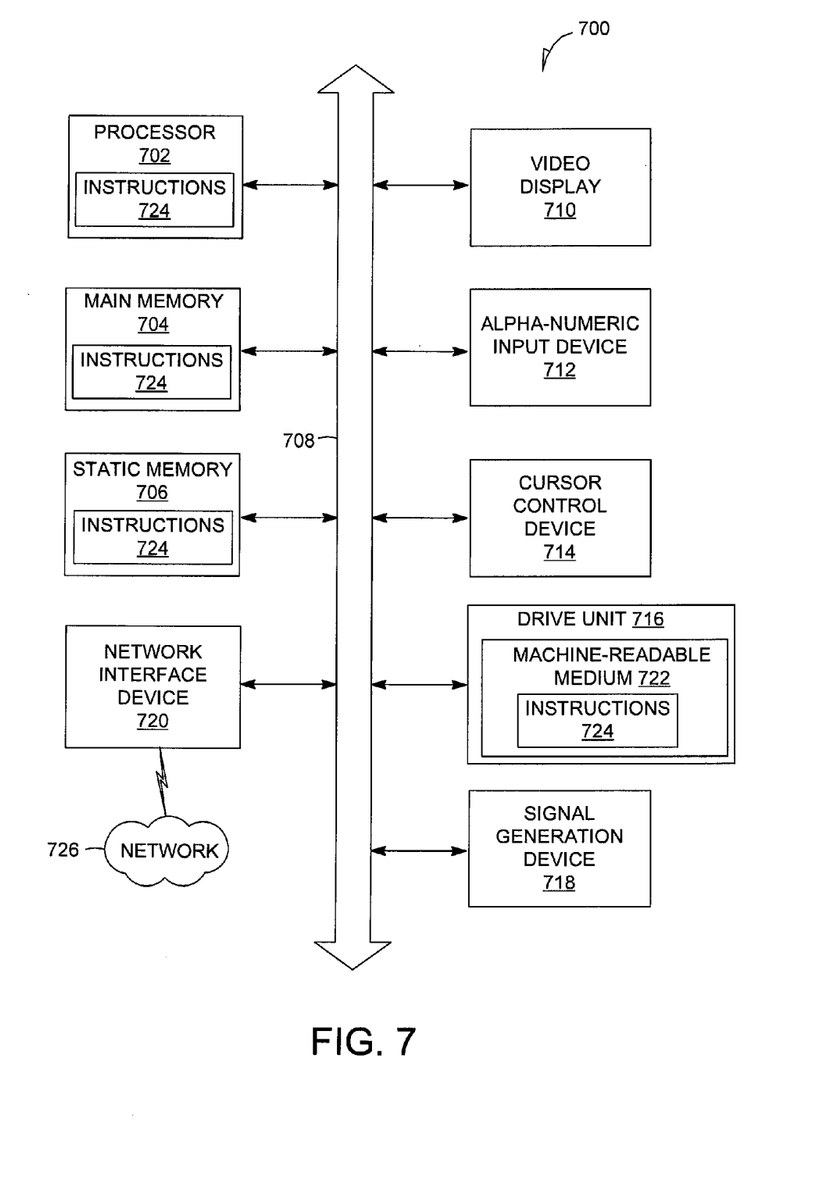
FIG. 7 is a simplified block diagram of a machine in an example form of a computing system within which a set of instructions for causing the machine to perform any one or more of the methodologies discussed herein may be executed.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In example embodiments, the computer system 700 also includes one or more of an alphanumeric input device 712 (e.g., a keyboard or touchscreen), a user interface (UI) navigation device or cursor control device 714 (e.g., a mouse or touchscreen), a disk drive unit 716, a signal generation device 718 (e.g., a speaker), and a network interface device 720.

Machine-Readable Storage Medium

The disk drive unit 716 includes a machine-readable storage medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, with the main memory 704 and the processor 702 also constituting machine-readable media.

While the machine-readable storage medium 722 is shown in an example embodiment to be a single medium, the term "machine-readable storage medium" may include a single storage medium or multiple storage media (e.g., a centralized or distributed database, or associated caches and servers) that store the one or more instructions 724. The term "machine-readable storage medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived there from, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system comprising:
a data collection module to receive, via a user interface, a query that corresponds to a particular product; and
a recommendation module comprising one or more hardware processors to:
access transition data for the particular product, the transition data including values indicating a number of search transitions based on a change in queries between the particular product and other products in previous session sets of queries, the transition data determined based on analysis of the previous session sets of queries;
determine one or more recommendations based on the transition data, the one or more recommendations determined by applying a weighting function for transition data based on a recommendation depth, each recommendation depth being a level corresponding to a number of serial transitions between the particular product and each of the other products, and
cause a display of the one or more recommendations to a querying user.

2. The system of claim 1, wherein the product is published information.

3. The system of claim 1, further comprising a mapping module to map each search query from the previous session sets of queries to a product.

4. The system of claim 1, further comprising a reformulation module to generate the transition data by incrementing a transition count corresponding to the particular product and one of the other products each time a search query changes from the particular product to the one of the other products in a same search session of the previous session sets of queries.

5. The system of claim 1, wherein the determining the one or more recommendations comprises removing a recommendation based on a threshold number of non-selections of the recommendation.

6. The system of claim 1, wherein the determining the one or more recommendations comprises removing a recommendation previously selected by the querying user.

7. The system of claim 1, wherein the determining of the one or more recommendations comprises using a weighted function of one-way transition data between the particular product and the other products and one-way transition data between the other products and the particular product.

8. A method comprising:
- receiving, via a user interface, a query that corresponds to a particular product;
- accessing, using a hardware processor, transition data for the particular product, the transition data including values indicating a number of search transitions based on a change in queries between the particular product and other products in previous session sets of queries, the transition data determined based on analysis of the previous session sets of queries;
- determining one or more recommendations based on the transition data, the one or more recommendations determined by applying a weighting function for transition data based on a recommendation depth, each recommendation depth being a level corresponding to a number of serial transitions between the particular product and each of the other products, and
- causing a display of the one or more recommendations to a querying user.

9. The method of claim 8, wherein the product is published information.

10. The method of claim 8, further comprising mapping each search query from the previous session sets of queries to a product.

11. The method of claim 8, further comprising generating the transition data by incrementing a transition count corresponding to the particular product and one of the other products each time a search query changes from the particular product to the one of the other products in a same search session of the previous session sets of queries.

12. The method of claim 8, wherein the determining the one or more recommendations comprises removing a recommendation based on a threshold number of non-selections of the recommendation.

13. The method of claim 8, wherein the determining the one or more recommendations comprises removing a recommendation previously selected by the querying user.

14. The method of claim 8, wherein the determining of the one or more recommendations comprises using a weighted function of one-way transition data between the particular product and the other products and one-way transition data between the other products and the particular product.

15. A machine-readable storage medium having no transitory signals and storing instructions which, when executed by the at least one processor of a machine, cause the machine to perform operations comprising:
- receiving, via a user interface, a query that corresponds to a particular product;
- accessing transition data for the particular product, the transition data including values indicating a number of search transitions based on a change in queries between the particular product and other products in previous session sets of queries, the transition data determined based on analysis of the previous session sets of queries;
- determining one or more recommendations based on the transition data, the determining including applying a weighting function for transition data based on a recommendation depth, each recommendation depth being a level corresponding to a number of serial transitions between the particular product and each of the other products; and
- causing a display of the one or more recommendations to a querying user.

16. The machine-readable storage medium of claim 15, wherein the operations further comprise mapping each search query from the previous session sets of queries to a product.

17. The machine-readable storage medium of claim 15, wherein the operations further comprise generating the transition data by incrementing a transition count corresponding to the particular product and one of the other products each time a search query changes from the particular product to the one of the other products in a same search session of the previous session sets of queries.

18. The machine-readable storage medium of claim 15, wherein the determining the one or more recommendations comprises removing a recommendation based on a threshold number of non-selections of the recommendation.

19. The machine-readable storage medium of claim 15, wherein the determining the one or more recommendations comprises removing a recommendation previously selected by the querying user.

20. The machine-readable storage medium of claim 15, wherein the determining of the one or more recommendations comprises using a weighted function of one-way transition data between the particular product and the other products and one-way transition data between the other products and the particular product.

* * * * *

UNITED STATES PATENT AND TRADEMARK OFFICE
CERTIFICATE OF CORRECTION

PATENT NO. : 9,189,810 B2
APPLICATION NO. : 14/622417
DATED : November 17, 2015
INVENTOR(S) : Jammalamadaka Page 1 of 1

It is certified that error appears in the above-identified patent and that said Letters Patent is hereby corrected as shown below:

On the title page, item (73), delete "eBay, Inc.," and insert --eBay Inc.,--, therefor In the claims Column 13, line 4, Claim 8, delete "hardward" and insert --hardware--, therefor Column 13, line 17, Claim 8, delete "products," and insert --products;--, therefor Signed and Sealed this
First Day of March, 2016

Michelle K. Lee
*Director of the United States Patent and Trademark Office*